Aug. 9, 1966　　　H. L. McPHERSON　　　3,265,335
PITCH CONTROL FOR AIRCRAFT

Original Filed May 12, 1962　　　3 Sheets-Sheet 1

INVENTOR,
Harry L. McPherson
BY Weatherford & Weatherford
Attys

Aug. 9, 1966 H. L. McPHERSON 3,265,335
PITCH CONTROL FOR AIRCRAFT
Original Filed May 12, 1962 3 Sheets-Sheet 2
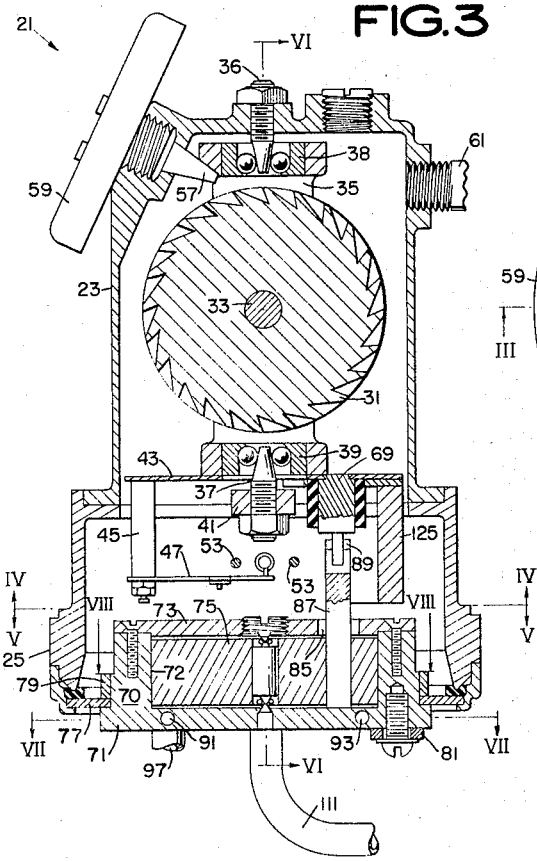
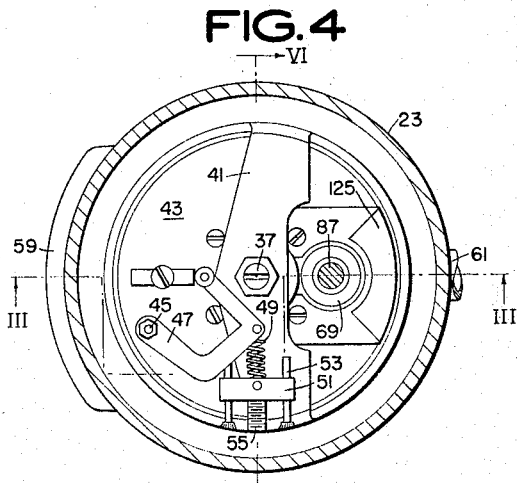
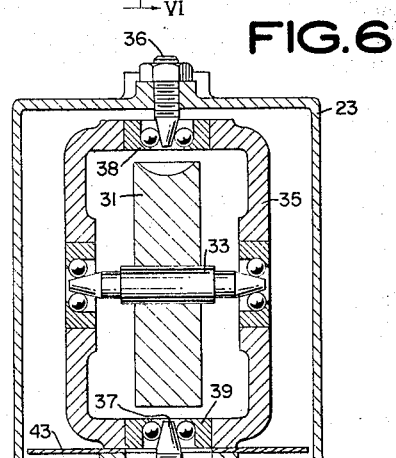
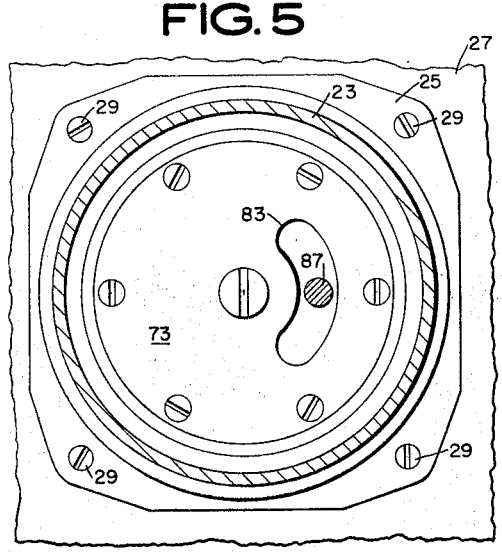
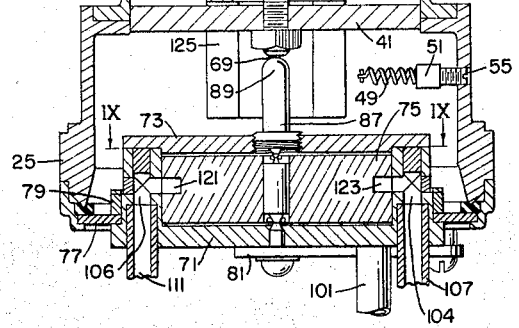
INVENTOR,
Harry L. McPherson
BY
Weatherford & Weatherford
attys

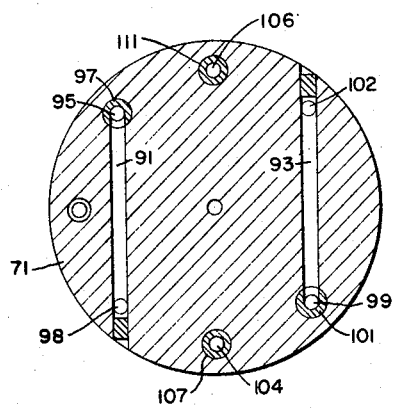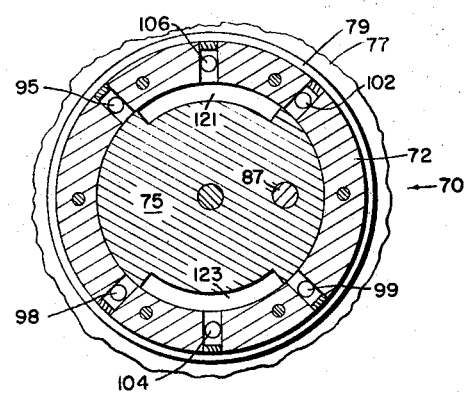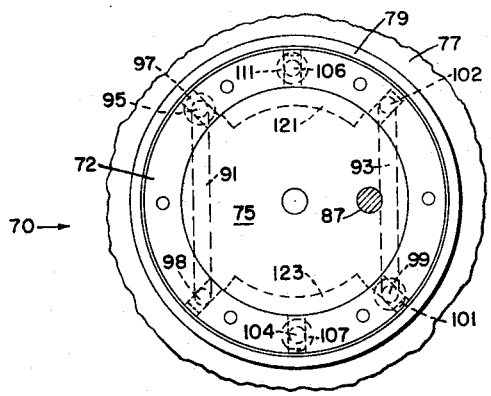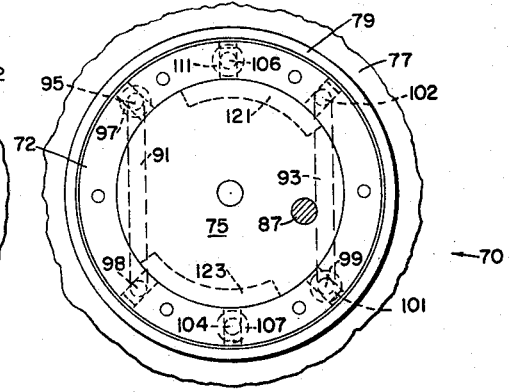

United States Patent Office 3,265,335
Patented August 9, 1966

1

3,265,335
PITCH CONTROL FOR AIRCRAFT
Harry L. McPherson, 1125 Poppen Drive, Memphis, Tenn.
Continuation of application Ser. No. 187,021, Apr. 12, 1962. This application Aug. 13, 1964, Ser. No. 392,070
11 Claims. (Cl. 244—79)

This invention relates to certain new and useful improvements in means for controlling aircraft flight, and particularly relates to means for controlling and correcting pitch of aircraft in which the aircraft deviates from straight and level flight to an attitude of incline or an attitude of decline.

This application is a continuation of application Serial Number 187,021, filed Apr. 12, 1962, now abandoned.

Many attempts have heretofore been made to automatically control and adjust variations in the pitch attitude of aircraft. Many of the prior attempts at such controls have required involved, expensive and difficult installations for accomplishing the purpose, have often proven ineffective from a commercial point of view, and have otherwise not been fully accepted, particularly in connection with small aircraft, on account of the expense of installation and the sometime uncertainty of action involved.

Other attempts have been made involving the utilization of a gyroscope purportedly coupled to control surfaces of the aircraft ostensibly for the same purpose. However, such employment of a gyroscope without other features such as comprise important features of the present invention does not accomplish the entire result desired, since the gyroscope is capable only of curing curvature in flight path such as leads toward the change of pitch attitude of the aircraft, but has no means involved therein for returning the aircraft to level flight attitude.

The present invention is directed toward the utilization of a gyroscope in connection with a rotatable operational means coupled to the gyroscope and operable by change of attitude through precession of the gyroscope under the torque exerted by a pitch curvature in line of flight resulting in a change of attitude of the aircraft, together with means unbalancing the gyroscope in altered flight attitude so as further to require the controls to be returned not only to straight uncurved flight, but also to flight which is level with the path desired.

In order to accomplish this purpose the present invention provides for coupling the gimbal ring by which the gyroscope is supported to a rotatable operational element so that upon torque force being applied through change in pitch attitude of the aircraft the precession of the gyroscope will effect rotation of the gimbal about its supporting axis, causing a rotation of the operational means and consequently effecting a manipulation of the control surfaces of the aircraft to which the device is connected. Additionally the gyroscope, including a balance disc, is provided with a weighted member which, so long as the aircraft and the gyroscope are in normal attitude, does not disturb the balance of the gyroscope and gimbal, but when the attitude of the aircraft and of the gyroscope has been changed in undesired manner the force of gravity acts upon the weight so as to effect an unbalance of the gyroscopic arrangement and to require a cooperation between the gyroscopic-gimbal effect returning the aircraft to straight flight and the unbalance effect urging the return of the aircraft to level flight along the desired path.

The principal object of the present invention is to provide a simple gyroscopic device together with unbalance means coupled through rotatable means with control surfaces of the aircraft in order to effect automatic correction of undesired changes in pitch attitude of the aircraft.

A further object of the invention is to provide such a

2 device in which the rotor of the gyroscope is revolved upon an axis normally parallel with the longitudinal axis of the aircraft, supported by a gimbal ring rotatable upon an axis which is normally perpendicular to the longitudinal axis of the aircraft, and with the gimbal ring being connected through a balance disc to a rotatable member by which change in position and alteration in control connection may be effected.

A further object of the invention is to provide such a device in which a weight is disposed eccentrically of the balance disc so as to be affected by gravitational force due to change of attitude and position so as further to assist in the completion of the correction of flight attitude from undesired pitch positions.

A further object of the present invention is to provide such a device in which the rotatable operation member comprises a rotatable valve rotor adapted to effect appropriate communication for operation of the control surfaces of the aircraft.

A further object of the present invention is to provide such a device in which the rotatable valve means comprises an air valve adapted to effect respectively communication to vacuum and to atmosphere for the operation of suitable servo units for the operation of control surfaces of the aircraft; and A further object of the invention is generally to simplify, improve and make practical the design, construction and efficiency of means for controlling the pitch attitude of aircraft.

The means by which the foregoing and other objects of the present invention are accomplished and the manner of their accomplishment will be readily understood from the following specification upon reference to the accompanying drawings, in which:

FIG. 3 is a vertical sectional view, with certain parts shown in elevation, and other parts broken away for purposes of illustration taken as on the line III—III of FIG. 2.

FIG. 4 is an inverted sectional plan view taken as on the lines IV—IV of FIGS. 1 and 3.

FIG. 5 is a sectional plan view taken as on the lines V—V of FIGS. 1 and 3.

FIG. 6 is a vertical sectional view, with certain parts shown in elevation, and other parts broken away for purposes of illustration taken as on the line VI—VI of FIG. 3.

FIG. 7 is a sectional plan view taken as on the line VII—VII of FIG. 3.

FIG. 8 is a fragmentary sectional plan view taken as on the line VIII—VIII of FIG. 3.

FIG. 9 is a fragmentary sectional plan view taken as on the line IX—IX of FIG. 6; and FIG. 10 is a view similar to FIG. 9 showing the operational rotor means in an operated position.

Figure 1:
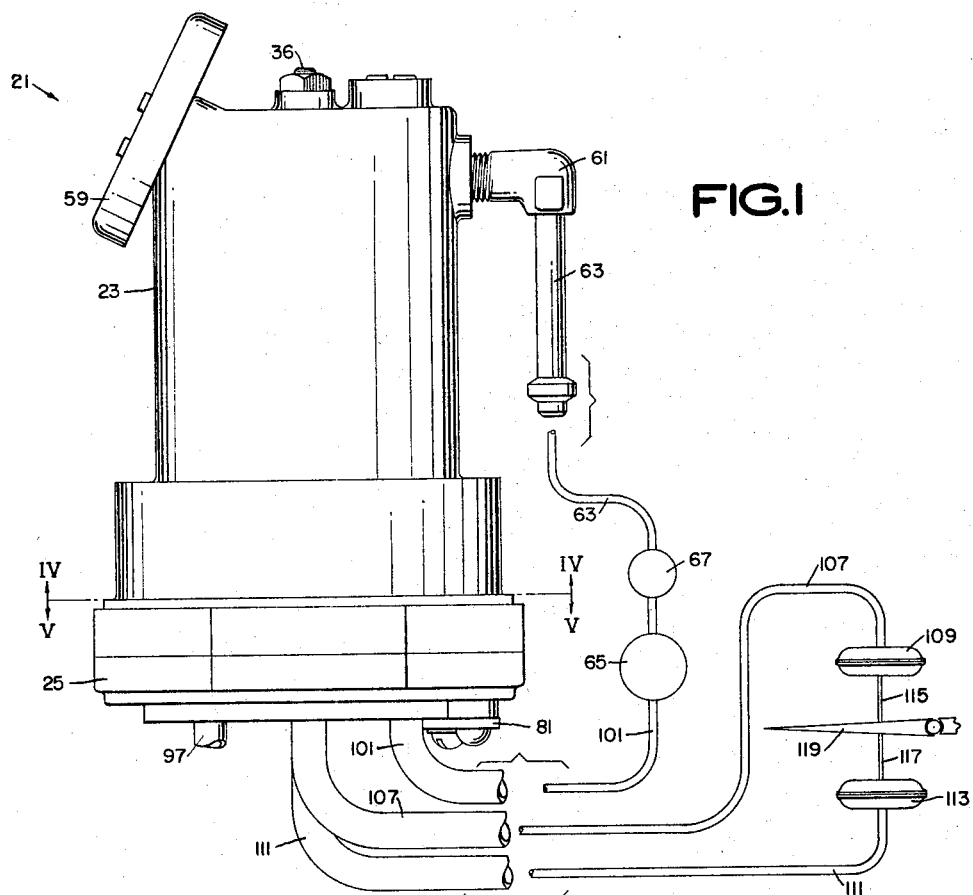
FIG. 1 is a side elevational view of the device of the present invention, with parts broken away for purposes of illustration, and with other parts relating to control surfaces of the aircraft being shown somewhat schematically.
Figure 2:
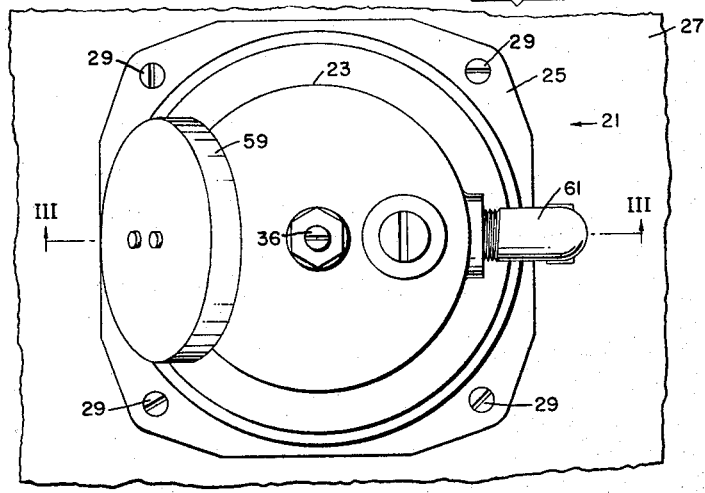
FIG. 2 is a top plan view of the device of the present invention, with a supporting shelf symbolical of the means by which the device may be supported in the aircraft being fragmentarily shown.

Referring now to the drawings in which the various parts are indicated by numerals, the means of the present invention comprises a sensing device generally indicated at 21, which includes an external casing 23. Casing 23 is provided with an enlarged base 25 which may be mounted suitably in an aircraft, as by attachment to a shelf 27, and be connected thereto as by screws 29 extending downwardly through the base of the case 25.

Housed within casing 23 is a gyro wheel 31 which is mounted for spinning movement upon a shaft 33, the axis of spinning rotation of the gyro wheel being normally parallel to the longitudinal axis of the aircraft. Gyro shaft 33 is rotatably supported at its opposite ends in a gimbal cage 35, gimbal cage 35 being supported for pivoting movement by upper and lower pivots 36, 37, which engage bearings 38, 39 in the cage. Upper gimbal pivot 36 is connected to the top of casing 23, while lower gimbal pivot 37 is connected to a bracket 41 which spans across casing 23 and is fixed thereto. The pivot axis of gimbal cage 35 about pivots 36, 37 is disposed perpendicular to the longitudinal axis of the aircraft and also perpendicular to the spin axis of gyro wheel 31.

Fixed to the lower end of gimbal cage 35 above the level of bracket 41 is a plate 43 which is thus adapted to turn pursuant to pivoting rotation of the gimbal cage in the operation of the device. Plate 43 is preferably centrally cut out so as to embrace and not interfere with the lower pivot of the gimbal cage. Toward one side of plate 43 and centrally offset a post 45 is fixed, to which is connected one end of a spring loaded lever 47, the spring loaded lever being connected to a spring 49 seated against a block 51, block 51 being adjustably mounted on slide pins 53 to adjust the tension and compression of spring 49 for use purposes, the slide pins 53 being connected to casing 23, and the adjustment of the position of the block seat being effected by an adjustment screw 55 extending through the casing for external access.

Gyro wheel 31 is shown as of the air jet driven type and an air nozzle inlet 57 extends into discharge communication with the gyro wheel, with the air brought into nozzle 57 passing through a suitable air filter 59.

Preferably air flow through nozzle 57 is accomplished through a vacuum outlet 61 coupled as through a line 63 to a suitable source of vacuum 65. In the event that the vacuum source 65 is of a greater capacity than is desired for drive of the gyro wheel, a damper 67 may be interposed in line 63 between the vacuum source and vacuum outlet 61.

Also connected to plate 43 and extending downwardly therefrom, preferably spaced from post 45, is a drive pin 69.

It will be seen that gyro wheel 31, gimbal cage 35, the casing, the air nozzle, and the vacuum source for drawing the air to drive the gyro wheel, together with plate 43 and drive pin 69, comprise a gyro sensing unit commonly used in a number of present aircraft instruments which are readily available and easily adapted for use in the present system. The coupling of the gyro unit through the plate and the post to spring loaded lever 47 and thus to spring 49 serves to urge centering of the gimbal cage and also as a load factor against which the inertia of the spinning gyro wheel can be caused to operate.

Secured in the lower end of casing 23 are operational means adapted to be coupled to the sensing device so as to be driven thereby for selective operation of control surfaces of the aircraft. In the preferred embodiment here shown the operational means comprises an air valve assembly which includes a valve body 70 which is upwardly open and substantially dish-shaped with a flat bottom 71 and an upstanding peripheral wall 72. A valve body cover 73 is fixed to the upper edge of valve body wall 72 and covers the upwardly open portion of the body, and a valve rotor 75 is rotatably mounted in the valve body and below cover 73. Rotor 75 closely fits the interior of wall 72. The operational means comprising valve body 70, cover 73 and rotor 75, are mounted to the lower end of casing 23, as by a mounting ring 77, secured in position by a retainer ring 79.

Valve body 70 is held against rotation and other undesired movement by a link 81 which is secured at one end to the valve body bottom 71 and at its other end is secured to casing 23. It will be understood that the link 81 may be adjusted so as to permit shift of position of the valve body as desired, but that in normal operation of the device the link is tightly held in place in order to hold the valve body against undesired relative rotation.

Cover 73 is provided with an arcuate slot 83 which opens into communication with an aperture 85 in rotor 75, aperture 85 extending perpendicularly of the rotor. Connected to the lower end of drive pin 69 is a crank pin 87 which is preferably provided with a fork 89 at its upper end by which it is connected to drive pin 69 and which gives a limitedly hinged connection between the two elements to accommodate any possible drag in movement therebetween. Crank pin 87 extends downwardly from its fork connection to the drive pin through arcuate slot 83 and into rotor aperture 85, snugly engaging therein so that upon rotation of plate 43 under turning of gimbal cage 35 rotation of valve rotor 75 is accomplished.

Valve body bottom 71 is provided with a pair of substantially parallel air passages 91, 93, which extend substantially equidistantly along opposite sides of the center of the valve and spaced substantially outwardly therefrom. At one end air passage 91 communicates with a port 95 formed in and extending upwardly into valve body wall 72 intermediate the depth of the valve body wall. Port 95 extends downwardly through valve body bottom 71 and connects to a tube 97 extending below the sensing unit and being open to atmospheric pressure.

At its opposite end passage 91 communicates into an upwardly extending branch 98, which extends upwardly into wall 72 to a distance intermediate the depth of the wall and substantially equal to the upward extension of port 95 into the wall. Each of port 95 and branch 98 are additionally connected through the interior of wall 72, thus establishing communication to atmosphere into the interior of valve body 70 adjacent the upper end of port 95 and adjacent the upper end of branch 98.

Passage 93 is provided at one end with a port 99, port 99 being preferably substantially diametrically opposite to port 95. Port 99 extends upwardly into the wall 72 of the valve body intermediate the depth of the wall and a distance substantially equal to the extension thereinto of port 95 and branch 98. Port 99 further extends downwardly through and below bottom 71 of valve body 70 and at its lower end communicates with a tube 101 which is connected to vacuum source 65. At its opposite end passage 93 is provided with an upwardly extending branch 102 which extends upwardly into wall 72 a substantially equal distance intermediate the depth of wall 72. Both port 99 and branch 102 are inwardly communicated through wall 72 to the interior of the valve body. Thus there is established communication with the interior of the valve body to vacuum source 65 at the upper extremities of port 99 and branch 102.

Valve body 70 is provided with two additional ports 104, 106, which extend upwardly into wall 72 to a distance intermediate the depth of the wall substantially equal to the extension thereinto of ports 95, 99, and branches 98, 102. Each of ports 104, 106 extends downwardly through bottom 71 of valve body 70 and into port 104 is fitted a tube 107 by which port 104 is connected to a servo unit 109. Similarly a tube 111 is connected into port 106 and communicates that port with another servo unit 113.

Each of ports 104, 106 adjacent their upper ends at the intermediate level of the valve body are communicated into the interior of the valve body, thus establishing communication between the respective servos 109, 113, and the interior of valve body 70. Each of servo 109, 113 is schematically shown in FIG. 1 of the drawings and is preferably of the vacuum operated diaphragm type, and the servos are respectively connected as by cables 115, 117 to the aircraft control surface represented by an elevator 109. Ports 104, 106 are diametrically opposed and are disposed on an axial line lying intermediate and substantially equidistant from passages 91, 93.

Valve rotor 75 is rotatably supported within the valve body between valve cover 73 and valve body bottom 71. Rotor 75 in its periphery and at a height substantially equal to the positioning of the upper ends of ports 95, 99, 104, 106 and branches 98, 102, is provided with arcuate channels 121, 123. Each of the channels is adapted to control intercommunication between the ports and branches formed in valve body wall 72. Thus in at rest position channel 121 is in direct communication with port 106. As shown in FIGS. 8 and 9, channel 121 terminates adjacent port 95 at one end and branch 102 at its opposite end, although not in communication with either port 95 or branch 102. Simultaneously channel 123 communicates with port 104 and is out of communication with port 99 and branch 98. Thus in at rest position both of the servos 109, 113 are at rest. As can readily be seen, upon shift of the position of valve rotor 75, intercommunication among the ports and branches and their respective outlets is effected and controlled.

Such change of position of the valve rotor is effected by turning of plate 43 under the precessional rotation of the gimbal cage pursuant to precession of the gyro wheel on change of attitude.

In order further to control and complete the proper operation of the present device a weight 125 is connected to the lower side of plate 43. Weight 125 is preferably substantially arcuate in cross section and extends substantially below plate 43 into adjacency with the cover 73 of the valve. Weight 125 partially surrounds drive pin 69 and crank pin 87, and is disposed radially outward from the gimbal axis defined by the pivots 36, 37, with the vertical center of weight 125 being disposed in a plane which perpendicularly intersects the gyro spin axis, is substantially parallel to the gyro wheel and to the gimbal axis so that weight 125 is disposed eccentrically with relation to the gimbal cage. Weight 125 is also positioned adjacent the periphery of plate 43 so as to be at extreme radial distance from the gimbal axis. Weight 125, being disposed off-center from the gimbal axis, shifts under the influence of gravity when a tilt develops in the attitude of the aircraft, the shift of the weight under such tilt urging movement of the gimbal cage to which the weight is connected in the direction of the precessional rotation of the gimbal cage initiated by the torque force of tilting movement of the aircraft.

When the device is installed in an aricraft it is disposed so that casing 23 is positioned substantially upright with the spin axis of gyro wheel 31 alined in parallelism with the longitudinal axis of the aircraft, and with the gimbal axis as defined by pivots 36, 37 disposed substantially perpendicularly to the spin axis of the gyro wheel and perpendicularly to the longitudinal axis of the aircraft. With the device thus disposed, plate 43 is positioned substantially parallel to the longitudinal axis of the aircraft and to the spin axis of the gyro wheel, and weight 125 is maintained in balance. Spring 49 serves to urge the retention of the gimbal cage is substantially centered position.

With the device thus mounted line 63 may be connected to vacuum source 65 in order to provide for drive of the gyro wheel. Tube 101 may be connected also to vacuum source 65 in order to provide a source of vacuum into the interior of the device, and tubes 107, 111 may respectively be connected to servo units 109, 113 in order to provide for the vacuum operation of the servo units under manipulation of the device pursuant to change in attitude of the aircraft. So long as the longitudinal axis of the aircraft remains parallel with its predetermined angle of flight the device remains in balance and no actuation is effected upon the instrumentalities connected therewith. In such attitude the air valve is in the position as best shown in FIGS. 8 and 9.

When, however, the aircraft deviates from the line of flight along its longitudinal axis the curvature, whether of decline or incline, imparts a torque force to the gyro wheel 31, the axis of which force is perpendicular to the spin axis of the gyro wheel, and also is perpendicular to the rotational axis of the gimbal cage, such torque force causing the gyro wheel to precess, effecting a movement thereof about the gimbal cage axis moving the gimbal cage therewith, and consequently moving plate 43 and the drive pin and crank pin connected thereto at the same time.

Thus for example, if the aircraft goes into a flight line of curvature upwardly from the original longitudinal axis of the aircraft, the precession of the gyro moves to effect shift of the valve rotor 75 from a position as shown in FIGS. 8 and 9 toward a position as shown in FIG. 10 of the drawings. When the valve rotor has moved in this manner channel 121 has shifted so as to establish communication between port 106 and branch 102 so as to communicate vacuum from vacuum source 65 through passage 93 and thence through line 111 to servo 113. Simultaneously channel 123 is shifted to communicate branch 98 with port 104 and to establish communication through passage 91 of servo 109 with atmosphere. When these shifts have been accomplished the actions of the servos are such that the vacuum force applied to servo 113 operates the diaphragm therein effecting operation of elevator 119 through cable 117 and with the opposite servo 109 under the influence of atmosphere yielding to that movement, thus effecting an adjusting movement of elevator 119 so as to urge correction of the attitude of the aircraft.

This correction, however, is not sufficient to solve the problem that is here present, since upon curing of curvature in the line of flight, the torque force applied to the gyroscope would be eliminated and the demands of the gyroscope would thus be satisfied when the aircraft had returned to a straight line of flight without curvature. This mere returning to a straight line of flight does not fully correct the attitude of the aircraft since the aircraft may fly in a straight line on a decline or on an incline, and yet the gyroscope will have no means of itself for returning the aircraft not only to straight flight but also to level flight.

Acordingly weight 125 plays its important part simultaneously with the precessing operation of the gyroscope under the torque force of curvature in flight. As has been pointed out weight 125 is disposed on plate 43 eccentrically of the gimbal axis, and when the attitude of the aircraft departs from level flight gravitational force urges weight 125 to move in the direction of tilt of the aircraft. The movement of weight 125 under tilt attitude of the aircraft moves the weight in the direction of the precessional rotation of the gimbal cage, and the weight continues to unbalance the gyroscope so long as the attitude of the aircraft is at either an incline or decline position, thus causing the valve rotor to be maintained in operational communication with the servos and thus with the control surfaces until the attitude of the aircraft has returned to level flight where weight 125 will resume a balance position. In this manner the aircraft is not only returned to straight flight, but also is returned to level flight in a smooth action without involving undue oscillation of the aircraft in achieving return to corrected flight attitude. When the aircraft has returned to normal position the gyro wheel and gimbal cage will have returned to normal position, and valve rotor 75 returned to the position as shown in FIGS. 8 and 9 of the drawings, reestablishing balance to both of the servos and interrupting operation of the elevator.

It will readily be understood that the present structure and the controls effected thereby may easily be overcome by manual controls as desired in the operation of the aircraft, and as can be seen the present device provides a simple and economical means automatically to effect correction in the pitch attitude of aircraft giving a satisfactory pitch control of an automatic nature and of smooth and certain operation to return the aircraft not only to a straight line of flight but also to a level line of flight.

It will further be observed and understood that, while the specific operational control has been herein shown and described in detail with relation to the air valve, other types of rotational controls may readily be coupled for drive by and pursuant to rotational movement of the gimbal cage. Thus it is readily apparent that suitable electric or electronic controls may be coupled and mounted for selective operation pursuant to gimbal cage movement and responsive to which operation of the elevator may be accomplished. It will be understood that, while weight 125 is shown and described specifically as mounted upon plate 43, the weight may be otherwise connected to gimbal cage 35, as for example, by direct attachment to the gimbal cage. In order to effect operational movement under tilt of the aircraft the weight should be offset from the axis of the gimbal and the size and shape of the weight may be varied and adjusted as different types of conditions arise.

It further will be seen that the operational controls may be directly connected to the gimbal cage, eliminating the interposition of the additional connection means shown herein.

I claim:

1. In an aircraft having control surfaces for effecting pitch movement about the transverse axis of the aircraft, pitch control means including a gyroscope comprising a gimbal cage pivotally supported with its axis of pivot substantially perpendicular to the longitudinal axis of said aircraft, a gyro wheel spinningly mounted in said gimbal cage with its axis of spin substantially parallel to said aircraft longitudinal axis, a plate fixed to said gimbal cage for pivoting therewith, said plate being substantially parallel to said aircraft longitudinal axis, pin means connected to and depending below said plate disposed radially outward from said gimbal pivot axis along a radius of said plate which is substantially parallel to said aircraft transverse axis, weight means connected to said plate radially outward from said pivot axis and said pin means, the vertical center line of said weight means disposed substantially on said plate radius whereby tilt of said plate responsive to pitch tilt of said aircraft urges said weight to move around said pivot axis under the force of gravity, said pitch tilt causing precession of said gyroscope in the direction of weight movement, operational means drivenly coupled to said pin means, said operational means comprising an air valve including a rotatable rotor parallel to said plate, vacuum operated means communicated with said air valve and connected to said control surfaces, a source of vacuum communicated to said air valve, rotation of said rotor respectively effecting communication of said vacuum operated means with said source of vacuum to operate said control surfaces and correct pitch curvature of said aircraft, movement of said operational means rotor thereby correcting flight curvature and said weight continuing such movement to effect correction of flight level.

2. In an aircraft having control surfaces for effecting pitch movement about the transverse axis of the aircraft, pitch control means including a gyroscope comprising a gimbal cage pivotally supported with its axis of pivot substantially perpendicular to the longitudinal axis of said aircraft, a gyro wheel spinningly mounted in said gimbal cage with its axis of spin substantially parallel to said aircraft longitudinal axis, a plate fixed to said gimbal cage for pivoting therewith, said plate being substantially parallel to said aircraft longitudinal axis, pin means connected to and depending below said plate disposed radially outward from said gimbal pivot axis along a radius of said plate which is substantially parallel to said aircraft transverse axis, weight means connected to said plate radially outward from said pivot axis and said pin means, the vertical center line of said weight means disposed substantially on said plate radius whereby tilt of said plate responsive to pitch tilt of said aircraft urges said weight to move around said pivot axis under the force of gravity, said pitch tilt causing precession of said gyroscope in the direction of weight movement, operational means drivenly coupled to said pin means, said operational means including a rotatable rotor parallel to said plate, vacuum operated means communicated with said rotor and connected to said control surfaces, a source of vacuum communicated to said rotor, rotation of said rotor respectively effecting communicatin of said vacuum operated means with said source of vacuum to operate said control surfaces and correct pitch curvature of said aircraft, movement of said operational means rotor thereby correcting flight curvature and said weight continuing such movement to effect correction of flight level.

3. In an aircraft having control surfaces for effecting pitch movement about the transverse axis of the aircraft, pitch control means including a gyroscope comprising a gimbal cage pivotally supported with its axis of pivot substantially perpendicular to the longitudinal axis of said aircraft, a gyro wheel spinningly mounted in said gimbal cage with its axis of spin substantially parallel to said aircraft longitudinal axis, a plate fixed to said gimbal cage for pivoting therewith, said plate being substantially parallel to said aircraft longitudinal axis, weight means connected to and depending below said plate disposed radially outward from said gimbal pivot axis with the vertical center of said weight means along a radius of said plate which is substantially parallel to said aircraft transverse axis, whereby tilt of said plate responsive to pitch tilt of said aircraft urges said weight to move around said pivot axis under the force of gravity, said pitch tilt causing precession of said gyroscope in the direction of weight movement, operational means drivenly coupled to said plate, said operational means including a rotatable rotor parallel to said plate, vacuum operated means communicted with said rotor and connected to said control surfaces, a source of vacuum communicated to said rotor, rotation of said rotor respectively effecting communication of said vacuum operated means with said source of vacuum to operate said control surfaces and correct pitch curvature of said aircraft, movement of said operational means rotor thereby correcting flight curvature and said weight continuing such movement to effect correction of flight level.

4. In an aircraft having control surfaces for effecting pitch movement about the transverse axis of the aircraft, pitch control means including a gyroscope comprising a gimbal cage pivotally supported with its axis of pivot substantially perpendicular to the longitudinal axis of said aircraft, a gyro wheel spinningly mounted in said gimbal cage with its axis of spin substantially parallel to said aircraft longitudinal axis, a plate fixed to said gimbal cage for pivoting therewith, said plate being substantially parallel to said aircraft longitudinal axis, pin means connected to and depending below said plate disposed radially outward from said gimbal pivot axis, weight means connected to said plate radially outward from said pivot axis and said pin means, whereby tilt of said plate responsive to pitch tilt of said aircraft urges said weight to move around said pivot axis under the force of gravity, said pitch tilt causing precession of said gyroscope in the direction of weight movement, operational means drivenly coupled to said pin means, said operational means comprising an air valve including a rotatable rotor parallel to said plate, vacuum operated means communicated with said air valve and connected to said control surfaces, a source of vacuum communicated to said air valve, rotation of said rotor respectively effecting communication of said vacuum operated means with said source of vacuum to operate said control surfaces and correct pitch tilt of said aircraft, movement of said operational means rotor thereby correcting flight curvature and said weight continuing such movement to effect correction of flight level.

5. In an aircraft having control surfaces for effecting pitch movement about the transverse axis of the aircraft, pitch control means including a gyroscope comprising a gimbal cage pivotally supported with its axis of pivot substantially perpendicular to the longitudinal axis of said aircraft, a gyro wheel spinningly mounted in said gimbal cage with its axis of spin substantially parallel to said aircraft longitudinal axis, weight means connected to said gimbal cage radially outward from said pivot axis, whereby tilt of said aircraft urges said weight to move around said pivot axis under the force of gravity, said pitch tilt causing precession of said gyroscope in the direction of weight movement, operational means drivenly coupled to said gimbal cage, said operational means including a rotatable rotor, control manipulating means communicated with said rotor and connected to said control surfaces, rotation of said rotor selectively effecting operation of said control manipulating means to operate said control surfaces and correct pitch tilt of said aircraft, movement of said operational means rotor thereby correcting flight curvature and said weight continuing such movement to effect correction of flight level.

6. In combination with an aircraft, a pitch control having a gyroscope with a gimbal ring having a rotor mounted therein, said gimbal ring being mounted to pivot about an axis perpendicular to the longitudinal axis of the aircraft, and gravity responsive means connected to said gimbal ring causing movement of said gimbal ring about said gimbal ring axis responsive to changing pitch attitude of said aircraft.

7. In combination with an aircraft, a pitch control having a gyroscope with a gimbal ring having a rotor mounted therein, said gimbal ring being mounted to pivot about an axis perpendicular to the longitudinal axis of the aircraft, a centralizing spring engaging said gimbal ring and urging it to assume a definite angular position about said gimbal ring axis, gravity responsive means unbalancing said gimbal ring about said gimbal ring axis except when said aircraft is in normal flight, whereby change in pitch attitude of said aircraft will cause movement of said gimbal ring about said gimbal ring axis.

8. In an aircraft having control surfaces for effecting pitch movement about the transverse axis of the aircraft, pitch control means including a gyroscope comprising a gimbal cage pivotally supported with its axis of pivot substantially perpendicular to the longitudinal axis of said aircraft, a gyro wheel spinningly mounted in said gimbal cage with its axis of spin substantially parallel to said aircraft longitudinal axis, weight means connected to said gimbal cage radially outward from said pivot axis, whereby tilt of said aircraft urges said weight to move around said pivot axis under the force of gravity, said pitch tilt causing precession of said gyroscope in the direction of weight movement, operational means drivenly coupled to said gimbal cage and connected to said control surfaces, movement of said operational means thereby correcting flight curvature and said weight continuing such movement to effect correction of flight level.

9. In combination with an aircraft, a pitch control having a gyroscope with a gimbal ring having a rotor mounted therein, said gimbal ring being mounted to pivot about an axis perpendicular to the longitudinal axis of the aircraft, a centralizing spring engaging said gimbal ring and urging it to assume a definite angular position about said gimbal ring axis, weight means connected to said gimbal ring and unbalancing said gimbal ring about said gimbal ring axis except when said aircraft is in normal flight, whereby change in pitch attitude of said aircraft will cause movement of said gimbal ring about said gimbal ring axis.

10. In combination with an aircraft, a pitch control having a gyroscope with a gimbal ring having a rotor mounted therein, said gimbal ring being mounted to pivot about an axis perpendicular to the longitudinal axis of the aircraft, a centralizing spring engaging said gimbal ring and urging it to assume a definite angular position about said gimbal ring axis, weight means connected to said gimbal ring eccentrically of said gimbal ring axis unbalancing said gimbal ring about said gimbal ring axis except when said aircraft is in normal flight, whereby change in pitch attitude of said aircraft will cause movement of said gimbal ring about said gimbal ring axis.

11. In an aircraft having control surfaces for effecting pitch movement about the transverse axis of the aircraft, pitch control means including a gyroscope comprising a gimbal cage pivotally supported with its axis of pivot substantially perpendicular to the longitudinal axis of said aircraft, a gyro wheel spinningly mounted in said gimbal cage with its axis of spin substantially parallel to said aircraft longitudinal axis, gravity responsive means connected to and unbalancing said gimbal cage, whereby tilt of said aircraft urges said gravity responsive means to move around said pivot axis under the force of gravity, said pitch tilt causing precessing of the gyroscope in the direction of gravity responsive means movement, operational means drivenly coupled to said gimbal cage and connected to said control means thereby correcting flight curvature and said gravity responsive means continuing such movement to effect correction of flight level.

References Cited by the Examiner

UNITED STATES PATENTS

| 1,592,081 | 7/1926 | Colvin | 74—5 X |
| 2,199,256 | 4/1940 | De Florez | 244—79 |
| 2,579,570 | 12/1951 | Hauptman | 244—79 |
| 3,006,580 | 10/1961 | Clarkson | 244—78 |

FOREIGN PATENTS 587,897   5/1947   Great Britain.

MILTON BUCHLER, *Primary Examiner.*

A. H. FARRELL, *Assistant Examiner.*